United States Patent

[11] 3,585,550

[72] Inventors Gerhard Dorsch
Weibenbrunn;
Wolfgang Wagnerberger, Nurnberg, both of, Germany

[21] Appl. No. 853,359
[22] Filed Aug. 27, 1969
[45] Patented June 15, 1971
[73] Assignee Siemens Aktiengesellschaft
Berlin, Munich, Germany
[32] Priority Sept. 6, 1968
[33] Germany
[31] P 17 64 934.2

[54] OBJECT HAVING SHARP MAGNETIC DIVISIONS
4 Claims, 4 Drawing Figs.

[52] U.S. Cl. .......... 335/302, 335/284
[51] Int. Cl. .......... H01f 7/02
[50] Field of Search .......... 335/284, 302

[56] References Cited
UNITED STATES PATENTS
2,060,260 11/1936 Spengler .......... 335/302 X
FOREIGN PATENTS
894,518 4/1962 Great Britain .......... 335/302

*Primary Examiner*—G. Harris
*Attorneys*—Curt M. Avery, Arthur E. Wilfond, Herbert L. Lerner and Daniel J. Tick

ABSTRACT: One of a pair of interlocking components of a desired configuration is magnetized with a first substantially planar surface of N polarity and a second spaced opposite substantially planar surface of S polarity. The other of the pair of interlocking components is magnetized with a first substantially planar surface of S polarity and a second spaced opposite substantially planar surface of N polarity. The interlocking components are assembled in a manner whereby their first surfaces are coplanar and present alternate magnetic polarities and their second surfaces are coplanar and present alternate magnetic polarities.

OBJECT HAVING SHARP MAGNETIC DIVISIONS

DESCRIPTION OF THE INVENTION

Our invention relates to an object having sharp magnetic divisions. More particularly, the invention relates to an object having sharp magnetic divisions and a method of making same.

For magnetic recordings with larger interval duration, the use of the known method for longitudinal magnetization is not expedient, since it results in the production of electrical signals only in the vicinity of magnetic pole variations when transmitted by Hall generators, for example. Hence, heretofore, magnetic divisions have been provided by transverse magnetization. In this type of recording, the gap of the sound head is arranged or positioned in parallel with the direction of movement of the recording. Although this permits a uniform magnetization across arbitrary lengths, it results in the production of a relatively low signal quality and a slight steepness in the signals in the areas of pole variation. In addition, in contrast to longitudinal recording, only slight trace widths may be produced without considerable effort and expense.

It is therefore necessary to adjust the readout devices with precision and to undertake the magnetic recordings in time sequence, one after another, by means of a recording device, by reversing the magnetizing current in accordance with the magnetic divisions. The known magnetizing process is therefore lengthy. Furthermore, when the quantity is great, each magnetic division has to be recorded individually.

The principal object of the present invention is to provide a new and improved method of making sharp magnetic divisions.

An object of our invention is to provide a new and improved object having sharp magnetic divisions.

An object of the invention is to provide a method of making sharp magnetic divisions which overcomes the disadvantages of the known methods.

An object of the invention is to provide a method of making sharp magnetic divisions which is simple, rapid and inexpensive in execution.

An object of the invention is to provide a method of making sharp magnetic divisions which is efficient, effective and reliable.

An object of the invention is to provide an object having sharp magnetic divisions which produces in a magnetic field sensitive device precise, distinct, effective, efficient and reliable signals indicating such divisions.

An object of the invention is to provide an object having sharp magnetic divisions which is suitable for use as a control disc, an angle coder, a longitudinal coder, an angle pacemaker, a longitudinal pacemaker, or an electronic motor.

In accordance with the present invention, an object having sharp magnetic divisions in a desired configuration for producing electrical signals in a magnetic field sensitive device, comprises a body having first and second spaced opposite substantially planar surfaces. The body has separate interlocking components in the desired configuration. One of a pair of interlocking components is magnetized with its first surface of N polarity and its second surface of S polarity and the other of the pair of interlocking components is magnetized with its first surface of S polarity and its second surface of N polarity. The assembled components present at each of the first and second surfaces alternate magnetic polarities.

The interlocking components may be of curvilinear configuration, of linear configuration, or of both curvilinear and linear configuration.

In accordance with the present invention, a method of making an object having sharp magnetic divisions in a desired configuration for producing electrical signals in a magnetic field sensitive device comprises the steps of magnetizing one of a pair of interlocking components of a desired configuration with a first substantially planar surface of N polarity and a second spaced opposite substantially planar surface of S polarity, magnetizing the other of the pair of interlocking components with a first substantially planar surface of S polarity and a second spaced opposite substantially planar surface of N polarity, and assembling the pair of interlocking components in a manner whereby their first surfaces are coplanar and present alternate magnetic polarities and their second surfaces are coplanar and present alternate magnetic polarities.

The interlocking components are of curvilinear configuration, linear configuration, or of both curvilinear and linear configuration.

In order that the present invention may be readily carried into effect, it will now be described with reference to the accompanying drawing, wherein.

In the FIGS., the same components are identified by the same reference numerals.

Figure 1:
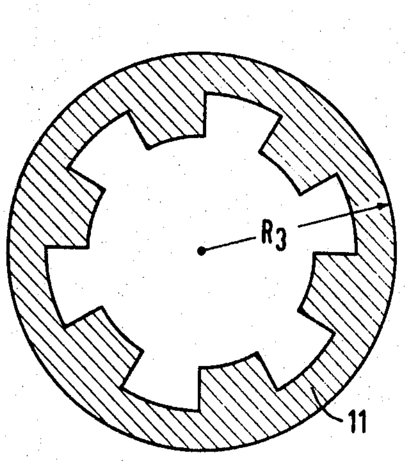
FIG. 1 is a schematic view of one of the pair of interlocking components of an object of our invention.
Figure 2:
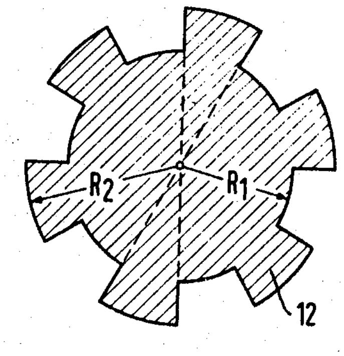
FIG. 2 is a schematic view of the other of the pair of interlocking components of the object of our invention of FIG. 1.
Figure 3:
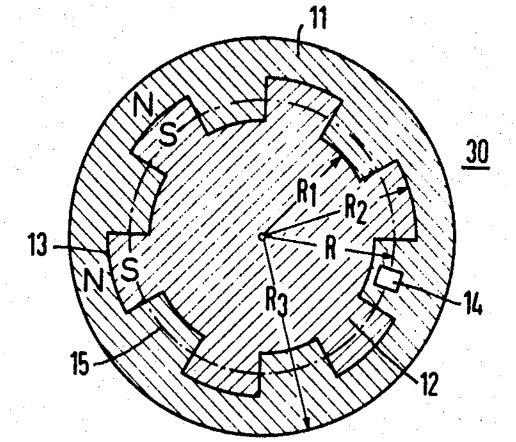
FIG. 3 is a schematic view of both interlocking components of the object of our invention of FIGS. 1 and 2 in assembled condition.

FIGS. 1 to 3 illustrate schematically how the object of our invention is made by the method of our invention. The object of FIGS. 1 to 3 is of disclike configuration comprising magnet-rubber foil such as, for example, barium ferrite with a flexible binder, of approximately 1 mm. thickness. The object comprises separate interlocking components 11 and 12.

The interlocking components 11 and 12 are cut out or punched out in the illustrated shape, as desired, and each is individually magnetized in a strong homogeneous field up to saturation. The body 11, 12 of FIG. 3 has first and second spaced opposite substantially planar surfaces, the first of said surfaces being in the plane of illustration and the second of said surfaces being behind said plane of illustration.

The interlocking component 11 is magnetized with its first surface of N polarity and its second surface of S polarity, as shown in FIG. 3. The interlocking component 12 is magnetized with its first surface of S polarity and its second surface of N polarity, as shown in FIG. 3. The components 11 and 12 are magnetized separately and independently from each other.

In the embodiment of FIGS. 1, 2 and 3, the disc 12 has the configuration of a toothed wheel, whose tooth flanks extend radially and whose root or inner circle has a radius $R_1$ and outer circle has a radius $R_2$. It is particularly favorable to provide the disc 11 with a radius $R_3$ which complies with the equation $$R_3 = R_2 - R_1$$

The disc 11 has a concentric recess in the shape of the disc 12. As hereinbefore described, the disc 11 is so magnetized, for example, that it constitutes a North pole on its surface, shown in FIGS. 1 and 3, and a South pole at its bottom, not shown. As hereinbefore described, the disc 12 is oppositely magnetized from the disc 11. When the disc 12 is inserted in the disc 11, as shown in FIG. 3, lines of force occur in the vicinity of the dividing line 13. The magnetic lines of force are perpendicular to the first surface and extend from the disc 11 back into the disc 12.

If a Hall generator 14 is utilized for scanning the magnetic flux, for example, it is advisable that said Hall generator be so positioned that during the rotation of the object of our invention, said Hall generator is positioned above a circular line 15. The circle 15 has a radius $R = (R_1 + R_2)/2$.

The Hall generator 14 generates positive or negative Hall voltages, in accordance with its position or location, above the disc 11 or the disc 12. Since the line 15 is always in the vicinity of the dividing line 13, the Hall generator 14 always moves in areas of maximum field intensities. As a result, the signal level hardly changes, even in the middle, between two pole variations from North to South. The zero passages at the pole variation locations are very steep and produce sharp, precise or exact signals during scanning by the Hall generator 14.

Figure 4:
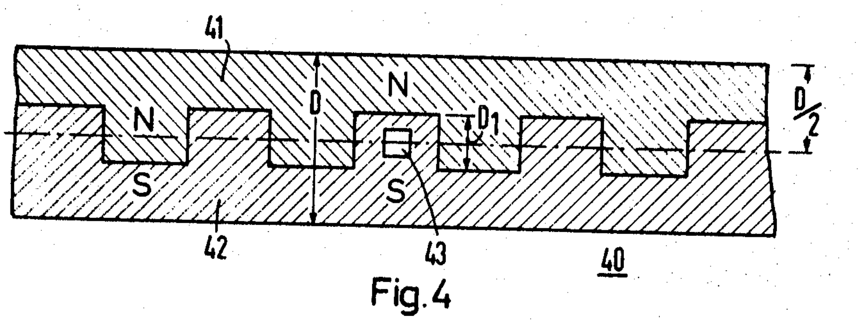
FIG. 4 is a schematic view of both interlocking components of another object of our invention in assembled condition.

Another embodiment of the object of the present invention is shown in FIG. 4. In the embodiment of FIG. 4, the interlocking components 41 and 42 are of linear configuration, so that the magnetic division is linear, rather than linear and curvilinear, as in the embodiment of FIG. 4. The magnetic division of the embodiment of FIG. 4 is linear meanderlike, whereas that of FIGS. 1 to 3 is curvilinear meanderlike. The object 40 of FIG. 4 has a total width D. In order to obtain a homogeneous magnetic flux, it is advantageous to dimension the width D so that it equals three times the width $D_1$ of the magnetic division.

A Hall generator 43 is positioned or located above a line which is equidistant from the edges of the object 40. The line above which the Hall generator 43 is positioned is thus a distance D/2 from each edge of the object, as shown in FIG. 4.

The embodiment of FIG. 4 is made in the same manner as the embodiment of FIGS. 1 to 3. The interlocking components 42 and 43 are cut out of a body of the same material, and each of said components is individually magnetized in the same manner as in the embodiment of FIGS. 1 to 3, in a strong homogeneous magnetic field, to saturation. The interlocking component 41 is magnetized so that its first surface, in the plane of illustration, constitutes a North pole and its second surface constitutes a South pole, as shown in FIG. 4. The interlocking component 42 is magnetized so that its first surface, in the plane of illustration, constitutes a South pole and its second surface constitutes a North pole, as shown in FIG. 4.

While the invention has been described by means of specific examples and in specific embodiments, we do not wish to be limited thereto, for obvious modifications will occur to those skilled in the art without departing from the spirit and scope of the invention.

We claim:

1. An object having sharp magnetic divisions in a desired configuration for producing electrical signals in a magnetic field sensitive device, said object comprising a body having first and second spaced opposite substantially planar surfaces, said body having separate interlocking components in the desired configuration, one of a pair of interlocking components being magnetized with its first surface of N polarity and its second surface of S polarity and the other of the pair of interlocking components being magnetized with its first surface of S polarity and its second surface of N polarity, and the assembled components presenting at each of the first and second surfaces alternate magnetic polarities.

2. An object as claimed in claim 1, wherein said interlocking components are of curvilinear configuration.

3. An object as claimed in claim 1, wherein said interlocking components are of linear configuration.

4. An object as claimed in claim 1, wherein said interlocking components are of curvilinear and linear configuration.

PO-1050
(5/69)

UNITED STATES PATENT OFFICE
CERTIFICATE OF CORRECTION

Patent No. 3,585,550 Dated June 15, 1971

Inventor(s) GERHARD DORSCH ET AL

It is certified that error appears in the above-identified patent and that said Letters Patent are hereby corrected as shown below:

In the address of the inventor, the name of the town "Weibenbrunn" should read --Weissenbrunn--

Signed and sealed this 29th day of August 1972.

(SEAL)
Attest:

EDWARD M.FLETCHER,JR.
Attesting Officer

ROBERT GOTTSCHALK
Commissioner of Patents